United States Patent [19]

Hagiwara et al.

[11] Patent Number: 5,279,915

[45] Date of Patent: * Jan. 18, 1994

[54] TONER COMPOSITION FOR ELECTROPHOTOGRAPHY

[75] Inventors: Kazuo Hagiwara; Akira Misawa; Kazuo Hisamatsu; Keiichi Ishikawa; Masaaki Shin, all of Kanagawa, Japan

[73] Assignee: Mitsui Toatsu Chemicals, Inc., Tokyo, Japan

[*] Notice: The portion of the term of this patent subsequent to Aug. 6, 2008 has been disclaimed.

[21] Appl. No.: 452,370

[22] Filed: Dec. 19, 1989

[30] Foreign Application Priority Data

Dec. 21, 1988 [JP] Japan .................. 63-320587

[51] Int. Cl.$^5$ .................. G03G 9/00; C08F 20/00
[52] U.S. Cl. .................. 430/109; 430/111; 525/440
[58] Field of Search .................. 430/109

[56] References Cited

U.S. PATENT DOCUMENTS

| | | | |
|---|---|---|---|
| 3,770,537 | 11/1973 | Elton | 521/114 X |
| 3,984,493 | 10/1976 | Kazama et al. | 525/129 |
| 4,164,114 | 8/1979 | Yabuki et al. | 528/308 |
| 4,833,057 | 5/1989 | Misawa et al. | 430/109 |
| 4,913,991 | 4/1990 | Chiba et al. | 430/45 |
| 5,037,715 | 8/1991 | Hagiwara et al. | 430/109 |

FOREIGN PATENT DOCUMENTS

| | | |
|---|---|---|
| 0104381 | 4/1984 | European Pat. Off. . |
| 0102115 | 7/1984 | European Pat. Off. . |
| 0256136 | 2/1988 | European Pat. Off. . |
| 3056659 | 3/1988 | Japan .................. 430/109 |

OTHER PUBLICATIONS

Patent Abstracts of Japan, vol. 12, No. 276 (P-737) (3123) Jul. 30, 1988.

*Primary Examiner*—Marion E. McCamish
*Assistant Examiner*—Stephen Crossan
*Attorney, Agent, or Firm*—Burns, Doane, Swecker & Mathis

[57] ABSTRACT

Disclosed is a toner composition for electrophotography which comprises, as a principal component, a urethane-modified polyester resin whose loss tangent (tan δ) has a maximum and a minimum both falling within the range of from 0.7 to 2.5, the loss tangent being determined at 150° C. and a frequency ranging from $10^{-2}$ to 10 Hz. The toner composition has excellent low temperature fixing ability and offset resistance as well as a wide range of permitted fixing temperature.

6 Claims, No Drawings

TONER COMPOSITION FOR ELECTROPHOTOGRAPHY

BACKGROUND OF THE INVENTION

The present invention relates to a toner composition for electrophotography and more specifically to a toner composition for electrophotography being excellent in both low-temperature fixing ability and offset resistance.

In electrophotography, images are obtained by forming electric latent images on a photosensitive substance by a variety of means utilizing photoconductive materials, then, the latent images are developed with a toner, followed by transferring the images onto an image support such as paper according to demand and then fixing the images with, for instance, a heating roll for fixing. A variety of resins have been investigated for use in such toners. In particular, polyester resins have been used as resins for toners which can be fixed to a transfer paper with a heating roll for fixing, because of their excellent properties such as ability for wetting the transfer paper, good compatibility with a coloring agent such as carbon black, and excellent fixing ability, when it is molten.

It is required in electrophotography that clear images be provided in a stable condition from the viewpoint of transfer of information. Recently, because the quantity of information to be handled has increased, a correspondingly faster rate of reproduction has been required. As the rate of reproduction increases, however, a great deal of heat is consumed by copying paper. Therefore, the surface temperature of the heating roll for fixing is greatly lowered in proportion to the increase in the number of copied paper. Thus, a toner is needed which does not exhibit an offset phenomenon and insufficient fixing, which has a wide range of permitted fixing temperature and which makes it possible to perform stable fixing, even when the surface temperature of the heating roll for fixing varies.

In conventional toners where a polyester resin is employed, additions such as a low molecular weight polyolefin or a partially incorporated a gel component have been used to eliminate the foregoing problems. However, the foregoing problems still have yet to be fundamentally solved, since the surface temperature of the heating roll for fixing is beyond the lower limit (low temperature fixing ability) and/or the upper limit (offset resistance) of the permitted fixing temperature of the toner.

SUMMARY OF THE INVENTION

Accordingly, an object of the present invention is to provide a toner composition for electrophotography have excellent low temperature fixing ability and offset resistance, and having a wide range of permitted fixing temperature.

After conducting various studies to achieve the foregoing object, the inventions have found that an excellent toner can be obtained by the use of a urethane-modified polyester resin having a loss tangent (tan δ) falling within a specific range, which have not been able to obtain conventionally.

According to the present invention, there is provided a toner composition for electrophotography which comprises, as a principal component, a urethane-modified polyester resin whose loss tangent (tan δ), determined at 150° and a frequency ranging from $10^{-2}$ to 10 Hz, has a maximum and a minimum both falling within the range of from 0.7 to 2.5.

DESCRIPTION OF THE PREFERRED EMBODIMENT

The urethane-modified polyester resins herein used are those obtained by reacting a mixture of a polyester resin (A) and a polyester resin (B), which will be defined below, with an isocyanate compound (C).

The foregoing polyester resin (A) is obtained through polycondensation of a polybasic carboxylic acid or a lower alkyl ester of a polybasic carboxylic acid with a polyhydric alcohol, of which OH value ranges from 20 to 60 mgKOH/g.

Examples of such polybasic carboxylic acids or lower alkyl esters thereof include aliphatic dibasic acids such as malonic acid, succinic acid, glutalic acid, adipic acid, azelaic acid, sebacic acid and hexahydrophthalic anhydride; aromatic dibasic acid such as phthalic anhydride, phthalic acid, terephthalic acid and isophthalic acid; and methyl esters as well as ethyl esters thereof.

Examples of the foregoing polyhydric alcohols are diols such as ethylene glycol, 1,2-propylene glycol, 1,3-propylene glycol, 1,3-butylene glycol, 1,4-butylene glycol, 1,6-hexanediol, neopentyl glycol, diethylene glycol, dipropylene glycol, hydrogenated bisphenol A and bisphenol A-propylene oxide adduct; and triols such as glycerin, trimethylolpropane and trimethylolethane. Among these, preferred is the bisphenol A-propylene oxide adduct.

The foregoing polycondensation can usually be performed according to techniques for high temperature polycondensation or solution polycondensation.

The molecular weight of the polyester resin (A) preferably ranges from 2,000 to 5,000 expressed in the number-average molecular weight. This is because, if a polyester resin (A) having a number-average molecular weight of less than 2,000 is employed, the resultant urethane-modified polyester resin would have low heat resistance and would cause a reduction in the molecular weight when it is molten and kneaded during the production of toners. Such a low molecular weight will cause fogging and a lowering of offset resistance. On the other hand, if a polyester resin (A) having a number-average molecular weight of more than 5,000 is used, the strength of the resultant urethane-modified polyester resin will be lowered.

The foregoing polyester resin (B) is obtained in the same manner used for producing the polyester resin (A) and should have an OH value of not more than 10 mgKOH/g. The number-average molecular weight thereof preferably ranges from 2,000 to 4,000. If the number-average molecular weight of the polyester resin (B) is less than 2,000, the offset resistance of the resulting toner will be reduced. If the number-average molecular weight of the polyester resin (B) is more than 4,000, both low temperature fixing ability and grindability of the toner will be reduced. Examples of polybasic carboxylic acids or lower alkyl esters thereof and polyhydric alcohols for the synthesis of the polyester resin (B), include those defined above in connection with the synthesis of the polyester resin (A).

The polyester resin (A) and the polyester resin (B) are used as a mixture in a weight proportion of from 10:90 to 80:20.

Examples of the foregoing isocyanate compound (C) include haxamethylene diisocyanate, isophorone diisocyanate, 2,4-tolylene diisocyanate, diphenylmethane diisocyanate, xylylene diisocyanate and tetramethylxylylene diisocyanate.

The compounding ratio of isocyanate compound (C) to the mixture of the polyester resins (A) and (B) is not critical, but will generally range from 0.3 to 1.99 expressed in the equivalent ratio, NCO/OH, of the amount of NCO groups of the isocyanate compound (C) to the total amount of OH groups of the polyester resins (A) and (B).

The urethane-modified polyester resins can be obtained, for instance, according to the following method. They can be obtained by adding isocyanate compound (C) in one portion or portions to a mixture of the polyester resins (A) and (B) in the presence or absence of a solvent at a temperature ranging from 60° to 180°C., and then reacting them at that temperature for several minutes to several hours.

Alternatively, it is also possible to react them by introducing the mixture of polyester resins (A) and (B) into a kneading means with a built-in screw and continuously adding the isocyanate compound (C) with kneading. As such a kneading means, an extruder is preferably employed, and in particular a twin-screw extruder is preferred. The ratio, L/D, of the length (L) to the diameter (D) of the screw preferably ranges from 20 to 60. The kneading is usually performed at a temperature ranging from 120° to 200° C., and a residence time ranging from 5 to 30 minutes.

In the present invention, it is essential that the urethane-modified polyester resin have a loss tangent (tan $\delta$) falling within a specific range. It has not been conventionally known to define the resin used in a toner composition for electrophotography by means of the loss tangent (tan $\delta$). The loss tangent value (tan $\delta$) of resins for toners varies depending on the temperature condition and the frequency range during the determination thereof, but the resin has a specific value of loss tangent if it is determined at specific temperature and frequency conditions. Therefore, it was determined for purposes of the present invention at a temperature of 150° C. which is a practical fixing temperature, and at a frequency ranging from $10^2$ to 10 Hz. The urethane-modified polyester resin used in the present invention should have maximum and minimum values of the loss tangent (tan $\delta$) determined at 150° C. and $10^{-2}$ to 10 Hz, both of which fall within the range of from 0.7 to 2.5, preferably 1.0 to 2.1. If even its minimum is less than 0.7, the low temperature fixing ability of the toner obtained using such a resin is impaired and the range of permitted fixing temperature becomes narrow. If a resin having a maximum of more than 2.5 is used, it leads to the lowering of the offset resistance of the resulting toner and the range of the permitted fixing temperature thereof becomes narrow.

The glass transition point of the urethane-modified Polyester resin preferably ranges from 45° to 75° C.

The toner composition for electrophotography according to the present invention comprises the above defined urethane-modified polyester resin, appropriate coloring agents and charge controlling agents and optionally other additives.

Examples of proper coloring agents include carbon black, Aniline Blue, Alkoyl Blue, Chrome Yellow, Ultramarine Blue, Quinoline Yellow, Methylene Blue, Phthalocyanine Blue, Malachite Green, Rose Bengale and magnetite.

In addition, known charge controlling agents can be incorporated into the toner composition. Examples thereof are Nigrosines, triphenylmethane type dyes and chromium complex of 3,5-di-tert-butylsalicylic acid.

Known additives may be used such as colloidal silica, zinc stearate, stearic acid amide and methylene bis-stearoamide.

The foregoing resin and other components to be incorporated can be previously mixed in, for instance, a Henschel Mixer, molten and kneaded in a kneader or the like at a temperature ranging from 100° to 180° C., following by grinding or pulverizing the resultant mass, classifying the ground product to obtain particles having a particle size ranging from 5 to 15 microns to thus provide toners for electrophotography.

The present invention will hereunder be described in more detail with reference to the following non-limitative working Examples and Preparation Examples.

Preparation Examples I to V

These Preparation Examples are given for illustrating the preparation of polyester resins (A).

To a 5 liter-volume 4-necked flask equipped with a reflux condenser, a water separator, an inlet for nitrogen gas, a thermometer and a stirring machine, there were added polybasic carboxylic acids and polyhydric alcohols of which kinds and amounts were shown in the following Table-1 and dehydration polycondensation was performed at a temperature ranging from 220° to 240° C. with introducing nitrogen gas into the flask. The polycondensation reaction was stopped at the time when the acid value of the resulting product became less than 1 to thus obtain polyester resins (A) I to V.

Preparation Examples i to v

These Preparation Examples are given for illustrating the preparation of polyester resins (B).

To a 5 liter-volume 4-necked flask equipped with a reflux condenser, a water or alcohol separator, an inlet for nitrogen gas, a thermometer and a stirring machine, there were added polybasic carboxylic acids or lower alkyl esters of polybasic carboxylic acids and polyhydric alcohols of which kinds and amounts were shown in the following Table-2 and dehydration or de-alcoholation polycondensation was performed at a temperature ranging from 220° to 240° C. with introducing nitrogen gas into the flask. The polycondensation reaction was stopped at the time when the acid value or hydroxyl value of the resulting product reached a desired value to thus obtain polyester resins (B) i to v.

Preparation Examples 1 to 10

These Preparation Examples are given for illustrating the preparation of urethane-modified polyester resins.

The polyester resins (A) and (B) each was pulverized to form particles thereof having a particle size ranging from 0.5 to 1 mm, weighed out in an amount shown in the following Table-3 and they were previously mixed in a Henschel Mixer. The premixed product was modified with an urethane in a twin-screw extruder (TEX-30 available from THE JAPAN STEEL WORKS, LTD.) in the following manner. Regarding the extrusion conditions, the temperature of the cylinder of the extruder was set so that the temperature of the resin was 150° C. and the number of revolution of the screw was adjusted so that the average residence time of the resin was equal to 20 minutes. The modification of the resin with urethane was performed by continuously feeding the premixed resin to the extruder at a desired flow rate using a quantity measuring feeder to perform melting and kneading of the resin, removing volatile matters present in the resin in vacuo through a first vent hole fitted to the extruder, continuously feeding a desired amount (see Table-3) of an isocyanate compound (C) (2,4-tolylene diisocyanate) through a second vent hole using a constant rate pump to perform the modification reaction. The resulting urethane-modified polyester resin was cooled and subjected to granulation.

Example

To 100 parts by weight each of the urethane-modified polyester resins obtained in Preparation Examples 1 to 10, there were dispersed and mixed, in a Henschel Mixer, 6 parts by weight of carbon black (MA-100, available from MITSUBISHI CHEMICAL INDUSTRIES LTD.) and 2 parts by weight of Spiron Black TRH (available from HODOGAYA CHEMICAL CO., LTD.) as a charge controlling agent and then the mixture was molten and kneaded in a twin-screw kneader PCM 30 (available from IKEGAI STEEL CO., LTD.) at 160° C. to obtain a toner composition in the form of mass.

The composition was granulated in a hammer mill, then finely pulverized in a jet mill (1DS2 Model, available from Japan Pneumatic Co., ltd.) and thereafter subjected to pneumatic classification to thus obtain toner particles having an average particle size of 10 microns (3% by weight: not more than 5 microns; 2% by weight: not less than 20 microns).

4 Parts by weight of the toner thus obtained was mixed with 100 parts by weight of Ferrite Carrier F-150 (Japan Iron Powder Co., Ltd.) to form a two-component developer.

Using a commercially available copying apparatus of a magnetic brush system (Leodry 8411, available from TOSHIBA CORPORATION), a copying test was performed by changing the temperature of a heating roller, in an environment maintained at room temperature (25° C.). The results on the estimation of permitted fixing temperature observed are listed in the following Table-3.

As seen from the results listed in Table-3, the toner obtained according to the present invention is excellent in both its low temperature fixing ability and offset resistance.

In the following Tables, notes are as follows:
1) KB 300K: Bisphenol A-(2,2)-propylene oxide adduct (available from MITSUI TOATUS CHEMICALS, INC.);
2) Mn: The number-average molecular weight determined by gel permeation chromatography (GPC) using monodisperse standard polystyrene as a standard, tetrahydrofuran as an eluent and a refractometer as a detector;
3) Mw: The weight-average molecular weight determined in the same manner used in the item 2);
4) Acid value: Determined by a method according to JIS K5400;
5) Hydroxyl value: Determined according to pyridine-acetic anhydride method;
6) Tg: The glass transition temperature determined by a differential scanning calorimeter (DSC);
7) Tan δ: The maximum and the minimum of the loss tangent determined at 150° C. according to a dynamic visco-elasticity measurement;
8) Offset initiation temperature: The lowest surface temperature of the heating roll for fixing at which there is observed the initiation of so-called offset phenomenon in which molten toners are adhered onto the heating roll surface and the adhered toners are again fixed on the subsequent copying paper;
9) A range of permitted fixing temperature: The difference between the offset initiation temperature and the lower limit of the fixing temperature.

TABLE 1

| | Preparation Example No. | | | | |
|---|---|---|---|---|---|
| | I | II | III | IV | V |
| Polyester resin (A) | | | | | |
| KB 300K[1] (Part) | 87 | 90 | 105 | 120 | 137 |
| Neopentyl glycol (Part) | 16 | 14 | 13 | 12 | 10 |
| Trimethylol propane (Part) | 3 | 5 | 6 | 8 | 10 |
| Diethylene glycol (Part) | 0 | 0 | 10 | 0 | 0 |
| Isophthalic acid (Part) | 60 | 64 | 84 | 80 | 90 |
| Hydroxyl value (mg KOH/g) | 63 | 56 | 40 | 29 | 8 |
| OH/COOH | 1.21 | 1.20 | 1.17 | 1.16 | 1.14 |
| Mn[2] | 1500 | 2200 | 3000 | 4900 | 5600 |
| Mw[3] | 4500 | 7100 | 9500 | 16000 | 17200 |

TABLE 2

| | Preparation Example No. | | | | |
|---|---|---|---|---|---|
| | i | ii | iii | iv | v |
| Polyester resin (B) | | | | | |
| KB 300K[1] (Part) | 300 | 280 | 260 | 270 | 280 |
| Trimethylol propane (Part) | 0 | 1 | 0 | 2 | 3 |
| Dimethyl terephthalate (Part) | 0 | 0 | 0 | 180 | 0 |
| Isophthalic acid (Part) | 185 | 160 | 140 | 0 | 138 |
| Mn[2] | 1800 | 2200 | 2900 | 3800 | 4500 |
| Mw[3] | 4600 | 5800 | 7500 | 9900 | 11500 |
| Acid value[4] (mg KOH/g) | 60 | 50 | 35 | — | 20 |
| Hydroxyl value[5] (mg KOH/g) | 10 | <1 | <1 | <1 | <1 |
| Tg (°C.)[6] | 45 | 48 | 68 | 57 | 75 |

TABLE 3

| | | Experiment No. | | | | | | | | | |
|---|---|---|---|---|---|---|---|---|---|---|---|
| | | 1 | 2 | 3 | 4 | 5 | 6 | 7 | 8 | 9 | 10 |
| Polyester resin (A) | Preparation example No. | I | II | II | II | III | III | IV | IV | IV | V |
| | (part) | 40 | 40 | 30 | 20 | 50 | 50 | 40 | 40 | 30 | 30 |
| Polyester resin (B) | Preparation example No. | iii | iii | iii | iii | i | ii | iv | v | v | iii |
| | (part) | 60 | 60 | 70 | 80 | 50 | 50 | 60 | 60 | 70 | 70 |
| | 2,4-Tolylene diisocyanate (part) | 3.6 | 3.6 | 3.6 | 3.6 | 3.6 | 3.6 | 3.6 | 3.6 | 3.6 | 3.6 |
| Urethane-modified polyester resin | Kneading temp. (°C.) | 160 | 160 | 160 | 160 | 160 | 160 | 160 | 160 | 160 | 160 |
| | Residence time (min) | 20 | 20 | 20 | 20 | 20 | 20 | 20 | 20 | 20 | 20 |
| | Tg[6] | 65 | 68 | 70 | 63 | 64 | 73 | 63 | 65 | 64 | 76 |
| | tan δ[7] | 2.6–2.9 | 0.8–1.8 | 1.2–1.9 | 1.3–2.1 | 2.6–3.0 | 1.0–1.8 | 0.8–1.8 | 0.4–0.6 | 0.4–0.6 | 0.4–0.6 |
| Fixing | Offset initiation temp. | 170 | 240< | 240 | 230 | 160 | 240< | 240< | 240< | 240< | 240< |

TABLE 3-continued

| | | Experiment No. | | | | | | | | | |
|---|---|---|---|---|---|---|---|---|---|---|---|
| | | 1 | 2 | 3 | 4 | 5 | 6 | 7 | 8 | 9 | 10 |
| ability | (°C.) | | | | | | | | | | |
| | Lower limit of fixing temp. (°C.) | 120 | 140 | 130 | 120 | 120 | 140 | 140 | 190 | 200 | 180 |
| | Range of permitted fixing temp. (°C.) | 50 | 100< | 110 | 110 | 40 | 100< | 100< | 50< | 40< | 60< |
| Inside or outside of the Scope of the present invention | | outside | inside | inside | inside | outside | inside | inside | outside | outside | outside |

We claim:

1. A toner composition for electrophotography comprising a urethane-modified polyester resin having a loss tangent (tan δ) with a maximum and a minimum both falling within the range of from 0.7 to 2.5, the loss tangent being determined at 150° C. and a frequency ranging from $10^{-2}$ to 10 Hz, and wherein said urethane-modified polyester resin is a reaction product of a mixture of a polyester resin (A) having an OH value ranging from 20 to 60 mgKOH/g and a polyester resin (B) having an OH value of not more than 10 mgKOH/g, with an isocyanate compound (C).

2. A composition according to claim 1, wherein the maximum and the minimum of the loss than (tan δ) are both in the range of from 1.0 to 2.1.

3. A composition according to claim 1, wherein the glass transition point of the urethane-modified polyester resin ranges from 45° to 75° C.

4. A composition according to claim 1, wherein the equivalent ratio, NCO/OH, of the amount of the NCO groups of isocyanate compound (C) to the total amount of OH groups of polyester resins (A) and (B), ranges from 0.3 to 1.99.

5. A composition according to claim 1, wherein the number-average molecular weight of the polyester resin (A) ranges from 2,000 to 5,000.

6. A composition according to claim 1, wherein the number-average molecular weight of polyester resin (B) ranges from 2,000 to 4,000.

* * * * *